United States Patent
Yang et al.

(10) Patent No.: US 9,577,435 B2
(45) Date of Patent: Feb. 21, 2017

(54) METHOD AND APPARATUS FOR MANAGING DEMAND RESPONSE RESOURCES IN A POWER DISTRIBUTION NETWORK

(71) Applicant: ABB Research Ltd., Zurich (CH)

(72) Inventors: Fang Yang, Menasha, WI (US); Salman Mohagheghi, Centennial, CO (US)

(73) Assignee: ABB Research Ltd., Zurich (CH)

( * ) Notice: Subject to any disclaimer, the term of this patent is extended or adjusted under 35 U.S.C. 154(b) by 394 days.

(21) Appl. No.: 14/199,311

(22) Filed: Mar. 6, 2014

(65) Prior Publication Data

US 2014/0316598 A1    Oct. 23, 2014

Related U.S. Application Data

(60) Provisional application No. 61/779,412, filed on Mar. 13, 2013.

(51) Int. Cl.
*H02J 3/38* (2006.01)
*H02J 4/00* (2006.01)
(Continued)

(52) U.S. Cl.
CPC ............... *H02J 4/00* (2013.01); *H02J 3/005* (2013.01); *H02J 3/14* (2013.01); *H02J 2003/003* (2013.01);
(Continued)

(58) Field of Classification Search
CPC ............ H02J 2003/003; H02J 2003/007; H02J 3/14; H02J 3/005; H02J 4/00; H02J 3/381; H02J 3/28; H02J 3/38; G06Q 50/06; F01K 25/06
See application file for complete search history.

(56) References Cited

U.S. PATENT DOCUMENTS 5,642,270 A    6/1997    Green et al.
5,815,824 A    9/1998    Saga et al.
(Continued)

FOREIGN PATENT DOCUMENTS

CN    101689277 A    3/2010
WO    2008118395 A1    10/2008
(Continued)

OTHER PUBLICATIONS

Schroder et al., Power and cost aware distributed load management, Apr. 2010, 4 pages.*

(Continued)

*Primary Examiner* — Thuy Dao
(74) *Attorney, Agent, or Firm* — Taft Stettinius & Hollister LLP

(57) ABSTRACT

In one aspect of the teachings herein, demand responsive loads are selected for involvement in a given DR event using an advantageous approach to selection that is based on using a mathematical network model to evaluate power loss in a power distribution network as a function of different combinations of demand responsive load selections and corresponding load reduction values. The mathematical network model comprises a mathematical representation of the power distribution network as a multi-phase unbalanced distribution network, including mathematical representations of the physical components in the power distribution network and the connecting relationships of those components. As overall power loss in the system is a function of different combinations of demand responsive load selections, the mathematical network model is used to evaluate system power loss under different demand response load selections, in a manner that automatically accommodates mesh networks and other complex network topologies, distributed generation sources, etc.

16 Claims, 7 Drawing Sheets

(51) Int. Cl.
*H02J 3/14* (2006.01)
*H02J 3/00* (2006.01)

(52) U.S. Cl.
CPC ....... *H02J 2003/007* (2013.01); *Y02B 70/3225* (2013.01); *Y02E 60/76* (2013.01); *Y04S 10/54* (2013.01); *Y04S 20/222* (2013.01); *Y04S 40/22* (2013.01)

(56) References Cited

U.S. PATENT DOCUMENTS

| | | | |
|---|---|---|---|
| 6,621,179 B1 | 9/2003 | Howard et al. | |
| 6,670,721 B2 * | 12/2003 | Lof | F03D 9/003 290/2 |
| 6,697,951 B1 | 2/2004 | Sinha et al. | |
| 7,149,605 B2 | 12/2006 | Chassin et al. | |
| 7,274,975 B2 | 9/2007 | Miller | |
| 7,478,070 B2 | 1/2009 | Fukui et al. | |
| 7,653,443 B2 | 1/2010 | Flohr | |
| 7,747,739 B2 | 6/2010 | Bridges et al. | |
| 7,778,738 B2 | 8/2010 | Taft | |
| 7,844,370 B2 | 11/2010 | Pollack et al. | |
| 7,949,435 B2 | 5/2011 | Pollack et al. | |
| 7,969,042 B2 * | 6/2011 | Corum | H02J 3/28 307/43 |
| 8,364,609 B2 | 1/2013 | Ozog et al. | |
| 8,796,884 B2 * | 8/2014 | Naiknaware | H02M 7/4807 307/102 |
| 9,118,216 B2 * | 8/2015 | Corum | H02J 3/28 |
| 9,455,577 B2 * | 9/2016 | Bhageria | H02J 4/00 |
| 2004/0158360 A1 | 8/2004 | Garland, II et al. | |
| 2005/0027636 A1 | 2/2005 | Gilbert et al. | |
| 2007/0282495 A1 | 12/2007 | Kempton et al. | |
| 2008/0040479 A1 | 2/2008 | Bridge et al. | |
| 2009/0063680 A1 | 3/2009 | Bridges et al. | |
| 2009/0066287 A1 | 3/2009 | Pollack et al. | |
| 2009/0174365 A1 | 7/2009 | Lowenthal et al. | |
| 2009/0187445 A1 | 7/2009 | Barclay et al. | |
| 2009/0200988 A1 | 8/2009 | Bridges et al. | |
| 2009/0210357 A1 | 8/2009 | Pudar et al. | |
| 2009/0313104 A1 | 12/2009 | Hafner et al. | |
| 2010/0013436 A1 | 1/2010 | Lowenthal et al. | |
| 2010/0017045 A1 | 1/2010 | Nesler et al. | |
| 2010/0079004 A1 | 4/2010 | Keefe et al. | |
| 2010/0088261 A1 | 4/2010 | Montalvo et al. | |
| 2010/0114387 A1 | 5/2010 | Chassin et al. | |
| 2010/0138065 A1 | 6/2010 | Taft | |
| 2010/0138066 A1 | 6/2010 | Kong et al. | |
| 2010/0179704 A1 * | 7/2010 | Ozog | G06Q 10/06315 700/291 |
| 2010/0179862 A1 | 7/2010 | Chassin et al. | |
| 2010/0211340 A1 | 8/2010 | Lowenthal et al. | |
| 2010/0211643 A1 | 8/2010 | Lowenthal et al. | |
| 2010/0235004 A1 | 9/2010 | Thind et al. | |
| 2010/0250014 A1 | 9/2010 | Taft | |
| 2010/0277121 A1 | 11/2010 | Hall et al. | |
| 2011/0004355 A1 | 1/2011 | Wang et al. | |
| 2011/0025556 A1 | 2/2011 | Bridges et al. | |
| 2011/0029148 A1 | 2/2011 | Yang et al. | |
| 2011/0035073 A1 | 2/2011 | Ozog | |
| 2011/0046806 A1 | 2/2011 | Nagel et al. | |
| 2011/0196546 A1 | 8/2011 | Muller et al. | |
| 2011/0231028 A1 | 9/2011 | Ozog | |
| 2013/0085624 A1 | 4/2013 | Yang et al. | |
| 2013/0173331 A1 | 7/2013 | Mohagheghi et al. | |
| 2013/0184889 A1 * | 7/2013 | Fan | H02J 3/14 700/292 |
| 2014/0285154 A1 | 9/2014 | Mohagheghi et al. | |
| 2014/0316598 A1 | 10/2014 | Yang et al. | |
| 2015/0378387 A1 * | 12/2015 | Chow | G05B 19/048 307/18 |
| 2016/0099567 A1 * | 4/2016 | Sun | H02J 3/14 700/296 |

FOREIGN PATENT DOCUMENTS

| | | |
|---|---|---|
| WO | 2011018703 A2 | 2/2011 |
| WO | 2012057846 A1 | 5/2012 |
| WO | 2012082173 A1 | 6/2012 |
| WO | 2013066501 A1 | 5/2013 |

OTHER PUBLICATIONS

Hoyer et al., Proactive dynamic resource management in virtualized data centers, May 2010, 10 pages.*
Pellley et al., Power routing: dynamic power provisioning in the data center, Mar. 2010, 12 pages.*
Doostizadeh, M. et al., "Optimal Energy Management of a Retailer with Smart Metering and Plug-In Hybrid Electric Vehicle", 10th International Conference on Environment and Electrical Engineering (EEEIC), Rome, Italy May 8-11, 2011, pp. 1-5.
Fang, X. et al., "Smart Grid—The New and Improved Power Grid: A Survey", from http://www.public.asu.edu/~xfang5/survey_smartgrid_2011.pdf, 2011, pp. 1-38.
Fang, X. et al., "Smart Grid—The New and Improved Power Grid: A Survey", IEEE Communications Surveys & Tutorials, vol. 14, No. 4, Fourth Quarter 2012, pp. 944-979.
Kempton, W. et al., "Vehicle-to-Grid Power Implementation: From Stabilizing the Grid to Supporting Large-Scale Renewable Energy", Journal of Power Sources, vol. 144, 2005, pp. 280-294.
Kleinberg, M. R. et al., "Improving Service Restoration of Power Distribution Systems Through Load Curtailment of In-Service Customers", IEEE Transactions on Power Systems, Vo. 26, No. 3, Aug. 2011, pp. 1110-1117.
Pang, C. et al., "PHEVs as Dynamically Configurable Dispersed Energy Storage for V2B Uses in the Smart Grid", 7th Mediterranean Conference and Exhibition on Power Generation, Transmission, Distribution and Energy Conversion, Agia Napa, Cyprus (Paper No. MED10/174), Nov. 7-10, 2010, pp. 1-6.
Viawan, F. A. et al., "Protection Scheme for Meshed Distribution Systems with High Penetration of Distributed Generation", Power Systems Conference: Advanced Metering, Protection, Control, Communication, and Distributed Resources, Clemson, SC, USA, Mar. 14-17, 2006, pp. 99-104.
Mohagheghi, S., et al., "Dispatching Mobile Energy Resources to Respond to Electric Power Grid Conditions", U.S. Appl. No. 13/820,691, filed Mar. 4, 2013.
Mohagheghi, S., et al., "Systems and Methods for Predicting Customer Compliance with Demand Response Requests", U.S. Appl. No. 13/991,591, filed Jun. 4, 2013.
Mohagheghi, S., et al., "Systems and Methods for Restoring Service Within Electrical Power Systems", U.S. Appl. No. 14/354,267, filed Apr. 25, 2014.
Author Unknown, "Demand Response: An Introduction", Rocky Mountain Institute. Overview of programs, technologies, and lessons learned; Southwest Energy Efficiency Project; Apr. 30, 2006. pp. 1-43. Boulder Colorado.
Yang, F., et al., "Systems and Methods for Integrating Demand Response with Service Restoration in an Electric Distribution System", U.S. Appl. No. 13/595,053, filed Aug. 27, 2012.

* cited by examiner

METHOD AND APPARATUS FOR MANAGING DEMAND RESPONSE RESOURCES IN A POWER DISTRIBUTION NETWORK

RELATED APPLICATIONS

This application claims priority under 35 U.S.C. 119 from the U.S. provisional patent application identified by App. No. 61/779,412, which was filed on 13 Mar. 2013 and which is incorporated herein by reference.

TECHNICAL FIELD

The present invention generally relates to power distribution networks, and particularly relates to managing demand response resources in such networks.

BACKGROUND

Electricity grids use "demand response" (DR) mechanisms to control loading on the grid, such as by shedding load or delaying load. DR operations depend on having one or more customer loads configured to respond to DR signaling. In an example implementation, the operator(s) of a given power distribution network determine that a DR event is needed, demand responsive loads are selected for participation in the DR event, and signaling is sent accordingly, to control the selected demand responsive loads. Control actions include shut-off, which essentially takes the load off the grid, but may also include percent-reduction commands that allow given loads to be reduced but not entirely shut off.

The process of selecting demand responsive loads (customers) during a DR event is traditionally a random process where the customers are selected based on the similarity of the constraints in their utility contracts and the time constraints of the DR event issued. The location and number of customers chosen this way is not necessary optimal because of the random nature of the selection process.

Other known selection techniques include the use of "electrical distance" as the selection factor used to determine which demand responsive loads are selected for participation in a given DR event. This approach drives the load selection process according to power loss evaluations that are determined according to the electrical distance model, which disfavors or otherwise complicates its application to mesh networks and other complex topologies and/or to networks that include distributed generation systems.

SUMMARY

In one aspect of the teachings herein, demand responsive loads are selected for involvement in a given DR event using an advantageous approach to selection that is based on using a mathematical network model to evaluate power loss in a power distribution network as a function of different combinations of demand responsive load selections and corresponding load reduction values. Using the model-based DR load selection as taught herein reduces the amount of load reduction that must be imposed on the power distribution network to achieve the required DR load reduction amount, based on minimizing power loss in the power distribution network, subject to a number of constraints.

In more detail, the mathematical network model comprises a mathematical representation of the power distribution network as a multi-phase unbalanced distribution network, including mathematical representations of the physical components in the power distribution network and the connecting relationships of those components. As overall power loss in the system is a function of different combinations of demand responsive load selections, the mathematical network model is used to evaluate system power loss amounts under different demand response load selections, in a manner that automatically accommodates mesh networks and other complex network topologies, distributed generation sources, etc.

In an example embodiment, a method is implemented in a computer system and selects demand responsive loads in a power distribution network for inclusion in a demand response (DR) event having a defined load reduction target. The method includes determining that the DR event has been triggered for the power distribution network, and identifying demand responsive loads in the power distribution network that are candidates for inclusion in the demand response event.

The method continues with selecting a set of the demand responsive loads to include in the DR event and determining corresponding load reduction values for the selected set of demand responsive loads. The selection of which demand responsive loads are included in the DR event, and the determination of the corresponding load reductions values to be used for the selected loads, is based on using a mathematical network model to evaluate power loss in the power distribution network. More particularly, the power loss is evaluated as a function of different combinations of demand responsive load selections and corresponding load reduction values.

The evaluation determines which combination of demand responsive load selections and corresponding load reduction values maximizes a reduction in power loss in the power distribution network, while simultaneously satisfying the defined load reduction target and a number of solution constraints. In other words, the evaluation determines a DR solution that satisfies the load reduction target for the DR event, while minimizing power loss in the power distribution network subject to network operating limits. The one or more network operating constraints include at least one of power flow limits, node voltage limits and distribution line capacity limits.

Advantageously, the mathematical network model and its associated system states provide a direct mechanism for ensuring compliance with the various network operating constraints. The method also includes saving or otherwise outputting a demand response solution that indicates the selected set of demand responsive loads and the corresponding load reduction values determined for the selected set of demand responsive loads.

In another embodiment, a computer system is configured to select demand responsive loads in a power distribution network for inclusion in a demand response event having a defined load reduction target. The computer system includes one or more memory or storage elements, input/output interface circuitry, and a processing circuit operatively associated with the input/output interface circuitry and the one or more memory or storage elements.

The processing circuit is configured to determine that the demand response event has been triggered for the power distribution network and identify demand responsive loads in the power distribution network that are candidates for inclusion in the demand response event. Further, the processing circuit is configured to select a set of the demand responsive loads to include in the demand response event and determine corresponding load reduction values for the selected set of demand responsive loads.

The processing circuits makes the determination based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints. The network operating constraints include at least one of power flow limits, node voltage limits and distribution line capacity limits.

The processing circuit is further configured to save or otherwise output a demand response solution that indicates the selected set of demand responsive loads and the corresponding load reduction values determined for the selected set of demand responsive loads. For example, the processing circuit saves the demand response solution to the memory or storage elements, e.g., for use by a computer-implemented control routine that coordinates the DR event, or the processing circuit outputs the demand response solution or control signaling corresponding to that solution via its associated input/output circuitry.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
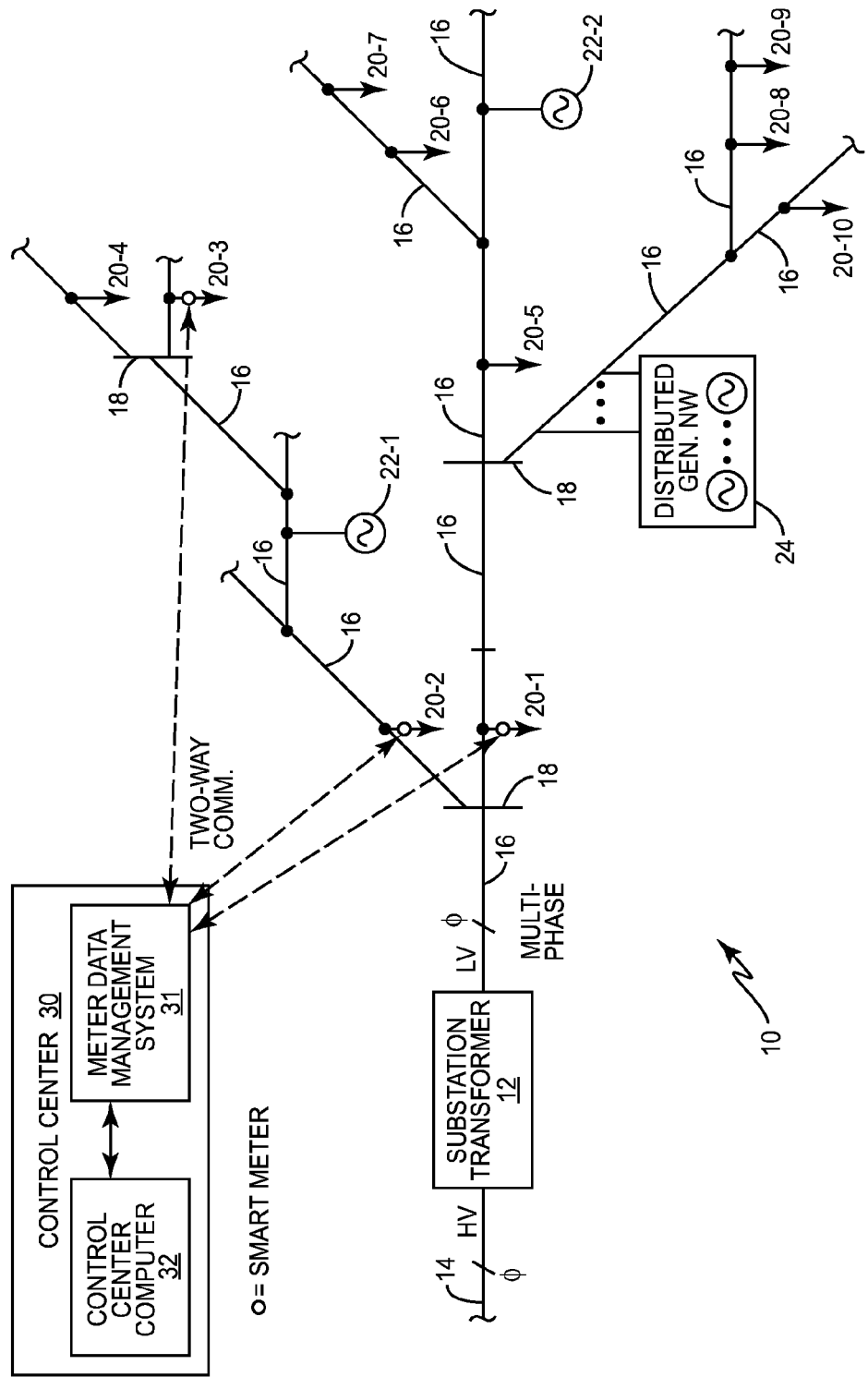
FIG. 1 is a block diagram of one embodiment of a distribution network, shown in conjunction with an Advanced Metering Infrastructure (AMI) system configured according to the teachings herein.

FIG. 1 is a simplified illustration of an example power distribution network (PDN) 10. The PDN 10 in this example embodiment is a low voltage (LV) electric grid that is at least partly powered via a substation transformer 12 that is coupled to a high voltage (HV) electric grid through a multiphase connection 14—e.g., transmission lines in a three-phase HVAC electric transmission grid.

Correspondingly, the PDN 10 includes multiphase branches or lines 16, buses 18, and loads 20. At least some of the loads 20 are demand response (DR) event resources, meaning that they can be controlled to shed load from the PDN 10 in a DR event. While the loads are numbered 20-1, 20-2, and so on, this discussion uses suffixes only where necessary for clarity and otherwise the terms "load 20" and "loads 20" are used for convenience.

In at least some embodiments, the PDN 10 includes one or more distributed generation sources 22 and/or one or more distributed generation networks 24. By way of example, a "distributed generation source 22" is coupled to the PDN 10 and thus operates on the distribution side of the overall electrical grid. Distributed generation sources 22 include, for example, wind turbines, solar power sites, etc. It will be appreciated that such sources exhibit potentially wide variation in the amount of power they inject into the PDN 10—indeed, they may be offline altogether at certain times of day or during certain weather conditions. Larger networks 24 of these distribution generation sources 22—e.g., larger scale solar power or wind power farms—further complicate evaluation of power flow and capacity for the PDN 10.

In another complicating aspect, the actual topology of the PDN 10 may be quite complex. In an example case, the PDN 10 comprises a "mesh" network, wherein the many interconnecting nodes result in a multiplicity of branch/node variables to evaluate for an accurate assessment of power flows and overall system states in the PDN 10. As with the distributed generation complexities, these topology complications are automatically considered or subsumed into the network model used in the demand response (DR) event processing taught herein.

FIG. 1 also illustrates a control center 30, which is not part of the PDN 10 but is associated with it. The control center 30 includes a meter data management system 31, which is part of an Advanced Metering Infrastructure (AMI) system that includes smart meters at one or more customer loads 20, along with two-way communication links to those smart meters. Note that FIG. 1 illustrates only an example set of customer loads 20 and shows only a few smart meters, e.g., at loads 20-1, 20-2 and 20-3. Those of ordinary skill in the art will appreciate that the PDN 10 may include a potentially large number of loads 20, with many of them having smart meters or other DR-responsive equipment.

In any case, the smart meters shown by way of example are used to measure the load demand at respective customer premises and can be used to disconnect or adjust customer loads in a DR event. Thus, in this example context, the two-way communication links or mechanisms are used to convey (1) load measurement information from the customer site to the control center 30 and (2) control command(s) from the control center 30 (such as DR signaling) to the customer site(s). The meter data management system 31 located in the control center collects meter measurement and interacts with one or more other computer systems or functions with in the control center 30, e.g., with a computer system 32 that is in the control center 30.

Figure 2:
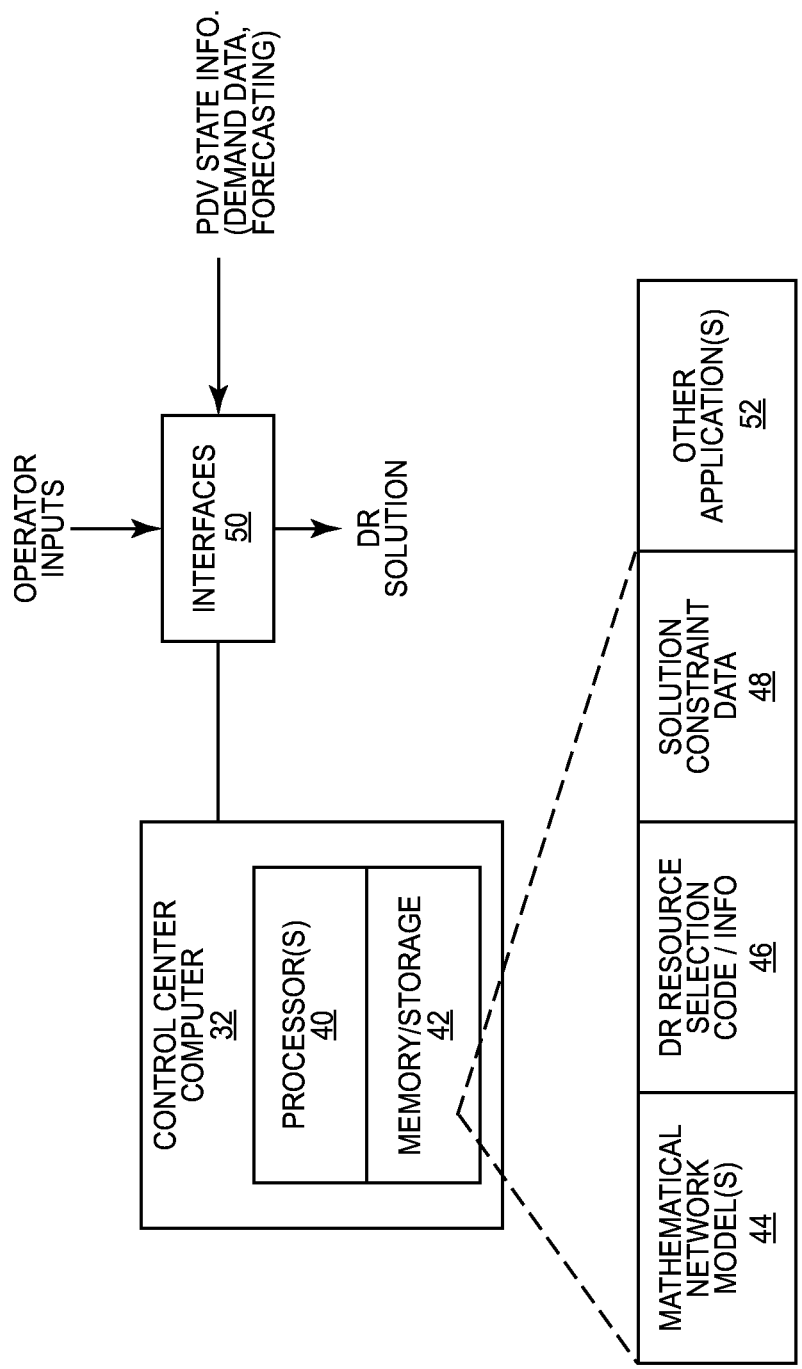
FIG. 2 is a block diagram of one embodiment of a control center computer system configured according to the teachings herein.

FIG. 2 provides example details for the computer system 32, wherein it includes one or more processors 40—e.g., CPUs—and associated memory/storage 42. The memory/storage 42 stores a mathematical network model 44, DR resource selection information 46—e.g., an identification of which loads 20 in the PDN 10 are demand responsive loads ("resources"), the DR control constraints associated with those demand responsive loads 20, and possibly additional information, such as DR contract information indicating any financial incentives owing to the customers corresponding to the demand responsive loads 20, to be paid for DR event participation, etc.

The memory/storage 42 also stores "code" comprising a computer program product including computer program instructions that, when executed by the processor(s) 40, cause the computer system 32 to carry out DR event processing as taught herein. In this regard, the memory/storage 42 will be understood as broadly representing one or more types of computer-readable medium and may be the memory or storage elements 34 introduced in FIG. 1, or may be distinct.

In any case, the memory/storage 42 further stores solution constraint data 48 and may store one or more other applications 52, representing further functionality provided by the control center 30. The solution constraint data 48 includes limits, for example, on the node or bus 18 voltages permitted within the PDN 10, limits on the current magnitudes permitted for the branches 16, etc. In general, the solution constraint data 48 includes limits for the various system state variables represented in the mathematical network model 44 of the PDN 10, which may be broadly referred to as "network operating limits." These constraints may be updated dynamically or from time to time as needed, and solution constraints 48 may also include other information, such as the targeted load reduction for a given DR event—i.e., the amount by which the overall demand or load in the PDN 10 is to be reduced using DR load control. Further solution constraints in the solution constraint data 48 may comprise specified load reduction limits for given demand responsive loads 20 in the PDN 10, time/date based limits on when given ones of the demand responsive loads 20 are available for participation in DR events, etc.

The mathematical network model 44, as directly implied by its name, is a mathematical representation of the physical network components and their connecting relationships. For example, the mathematical network model 44 (hereafter "model 44") may include all the loads (nameplate information and load profiles), transformers (nameplate information and configurations), power sources (capacity), switching devices (type and loading capability), distribution lines (conductor type, length, and impedance characteristics) and the interconnections (configuration) between them.

The computer system 32 also includes one or more interfaces 50 that are used for any number of information inputs, such as receiving DR information, system state information—i.e., the most current or live data representing voltages, phases, currents, etc., in the PDN 10. The computer system 32 also may receive operator inputs through the interface(s) 50, such as inputs indicating that a DR event has been called—i.e., a DR event trigger signal. Further, the computer system 32 may receive demand data and demand forecasting data, distributed generation output data and output forecasting data, etc., via the interface(s) 50, and may output any generated DR event solutions and/or corresponding load control signaling via the interface(s) 50.

Figure 3:
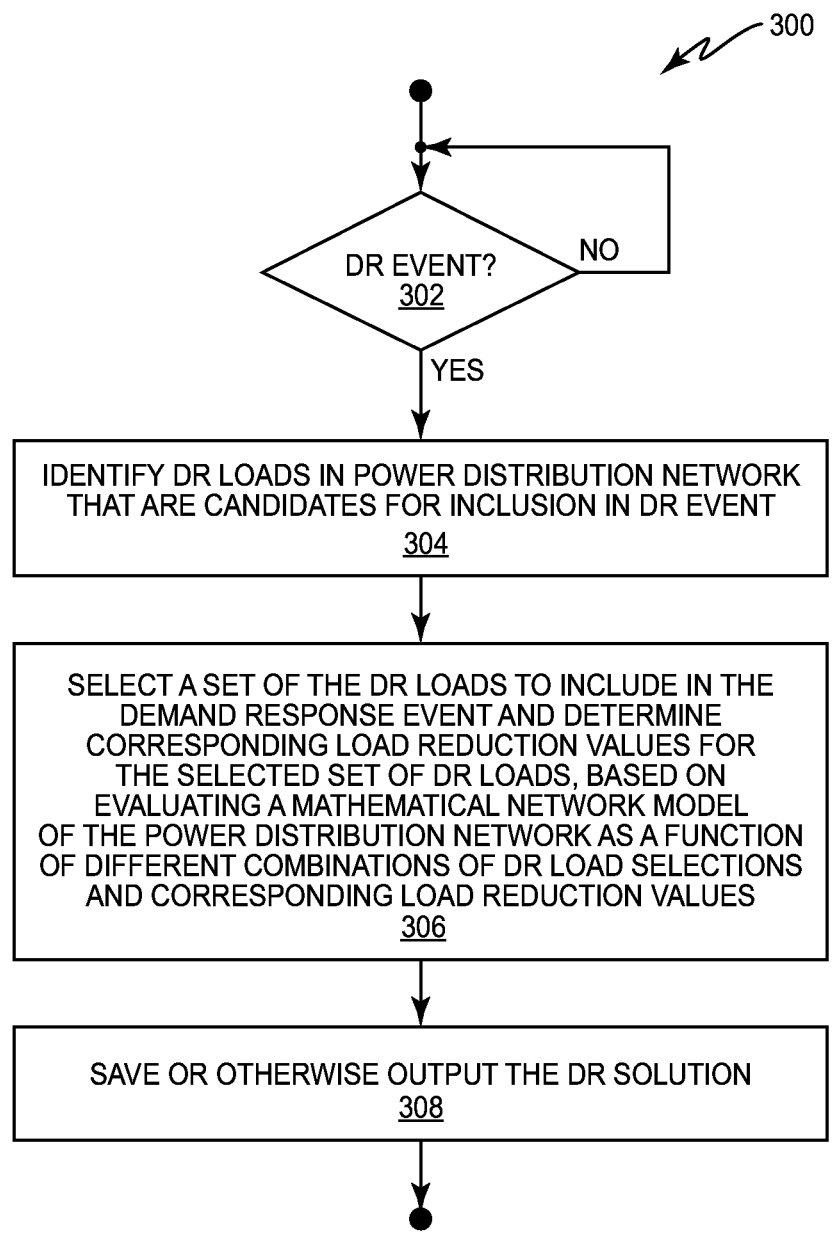
FIG. 3 is a logic flow diagram of one embodiment of a method of selecting demand responsive loads for inclusion in a demand response event.

The computer system 32 therefore is programmed and operative to carry out certain DR event processing according to the teachings herein. FIG. 3 illustrates an example method 300 that is performed by the computer system 32 in one or more embodiments—e.g., the computer program product (code) stored in memory/storage 42 comprises a computer program or function that causes the computer system 32 to carry out the method 300.

It will be understood that one or more of the method steps or operations presented in FIG. 3 may be performed in a different order than that illustrated and/or various aspects of the method 300 may be performed in parallel with one another, or performed as part of a larger set of overall processing operations.

With these points in mind, the method 300 includes determining that a demand response event has been triggered for the PDN 10 ("YES" from Block 302). For example, the method 300 may include monitoring current or forecasted demand for the PDN 10 against some defined demand limit, and triggering the DR event when overall demand is too high or is trending too high. In other configurations, the DR event is called by another computer system and signaled to the computer system 32, or the DR event is called by human operators and inputs into the computer system 32.

The method 300 further includes identifying demand responsive loads in the power distribution network that are candidates for inclusion in the demand response event (Block 304). Here, the identification of demand responsive loads 20 that are "candidates" for inclusion in the DR event may simply comprise identifying those loads 20 in the PDN 10 that are associated with DR customer service agreements or, more simply, with reference to a listing of those loads 20 in the PDN 10 that are demand responsive loads. In other embodiments, the processing at step 304 includes a more sophisticated screening, such as identifying the candidates as those demand responsive loads 20 that are not associated with contractual constraints—e.g., date restrictions, time-of-day restrictions, event duration restrictions—that would prevent them from being considered for the particular DR event at hand.

With the candidate demand responsive loads 20 thus determined, the method 300 continues with selecting a set of the demand responsive loads to include in the demand response event and determining corresponding load reduction values for the selected set of demand responsive loads (Block 306). This processing uses the model 44 to evaluate power loss in the PDN 10 as a function of different combinations of demand responsive load selections and corresponding load reduction values. That is, the particular demand responsive loads 20 that are selected for load reduction, and the particular amounts of load reduction applied to individual ones of those loads results in a particular change in overall system state for the PDN 10 and different system states correspond to different amounts of power loss within the PDN 10.

Thus, the model 44 allows the computer system 32 to evaluate the system states of the PDN 10, and thereby determine the power losses associated with different assumed combinations of load selections and corresponding load reduction values. Such processing may comprise performing a mathematical analysis, e.g., such as performing an iterative computational algorithm that uses the network model 44 to determine an optimized DR solution.

Figure 4:
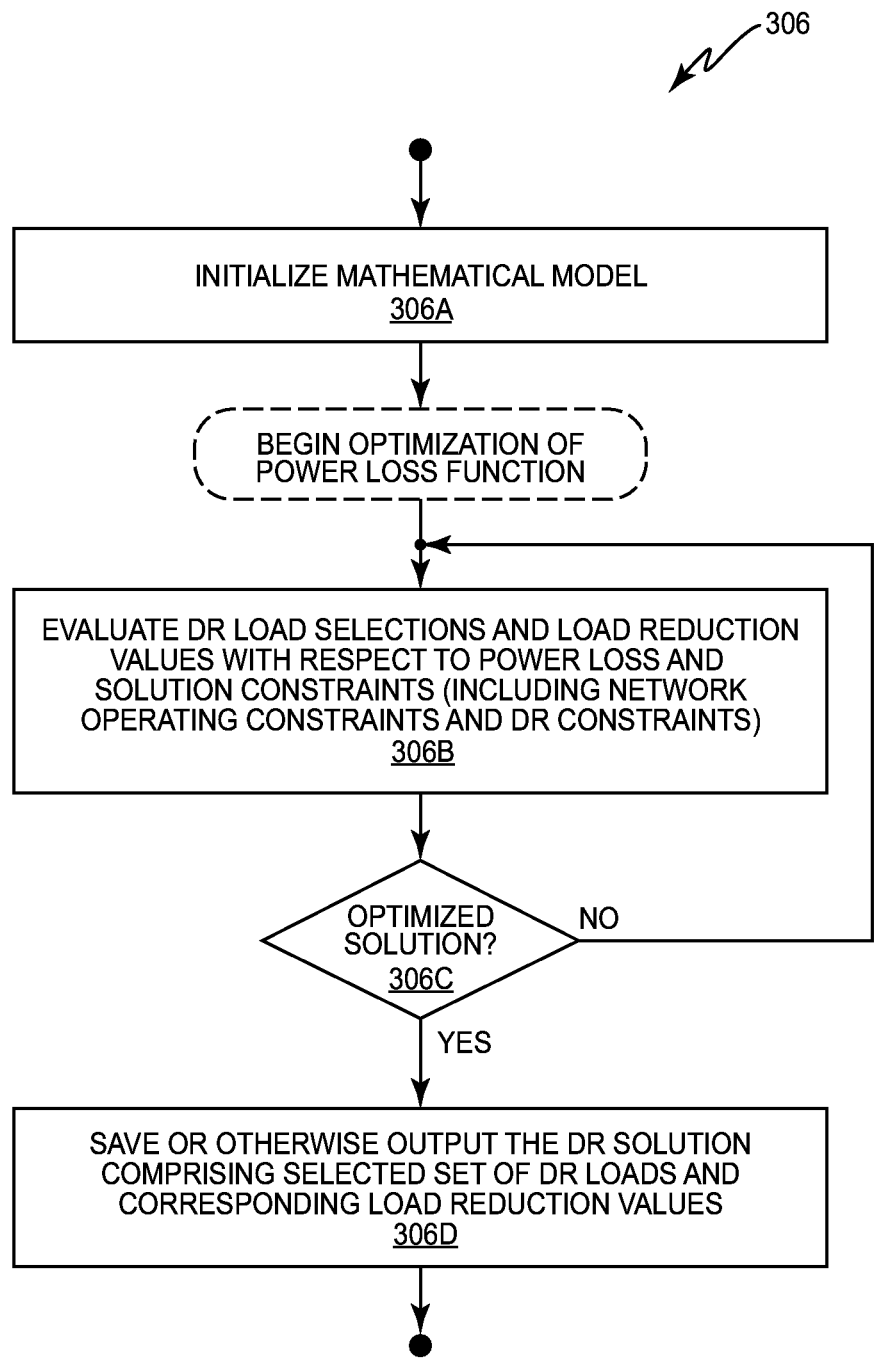
FIG. 4 is a logic flow diagram of one embodiment of details for a portion of the method introduced in FIG. 3.

FIG. 4 illustrates an example mathematical programming implementation, which can be understood as providing example details for the processing in Block 306 of the method 300. The processing depicted in FIG. 4 includes initializing the mathematical network model 44 (Block 306A), and then beginning optimization of a power loss function that depends on demand responsive load selection and the corresponding load reduction values.

The optimization processing, which generally is looped or otherwise iterated, includes evaluating demand responsive load selections and load reduction values with respect to power loss in the PDN 10, subject to all applicable system constraints (Block 306B). Such processing progresses until an optimum solution is found (Block 306C), subject of course to any convergence time or iteration limits. The optimum solution is then saved or otherwise output (Block 306D).

This processing allows the computer system 32 to determine which combination of demand responsive load selections and corresponding load reduction values maximizes a reduction in power loss in the power distribution network, while simultaneously satisfying the defined load reduction target and a number of solution constraints. As noted, the solution constraints include one or more network operating constraints, including at least one of power flow limits, node voltage limits and distribution line capacity limits.

The particular combination of demand responsive loads 20 that is selected and the particular load reduction values determined for respective ones of the selected demand responsive loads 20 constitute the demand response solution. Or, more generally, the demand response solution saved or outputted by the computer system 32 as part of the method 300 (Block 308) indicates the selected set of demand responsive loads 20 and the corresponding load reduction values determined for the selected set of demand responsive loads 20.

For example, some embodiments of the method 300 include sending signaling to customer premises equipment corresponding to the selected set of demand responsive loads 20, indicating the corresponding load reduction values determined for the selected set of demand responsive loads 20, to effectuate the demand response solution. Note that load reduction values may be expressed, e.g., as percent reductions in current or maximum loading.

The method 300 also may be extended to include comparing the demand response solution to an alternative demand response solution, e.g., one based on a randomly selected set of the demand responsive loads 20, and selecting for implementation either the demand response solution computed according to the method 300 or the alternative demand response solution. The selection is made in dependence on which solution sheds the least amount of customer loading from the PDN 10.

Figure 5:
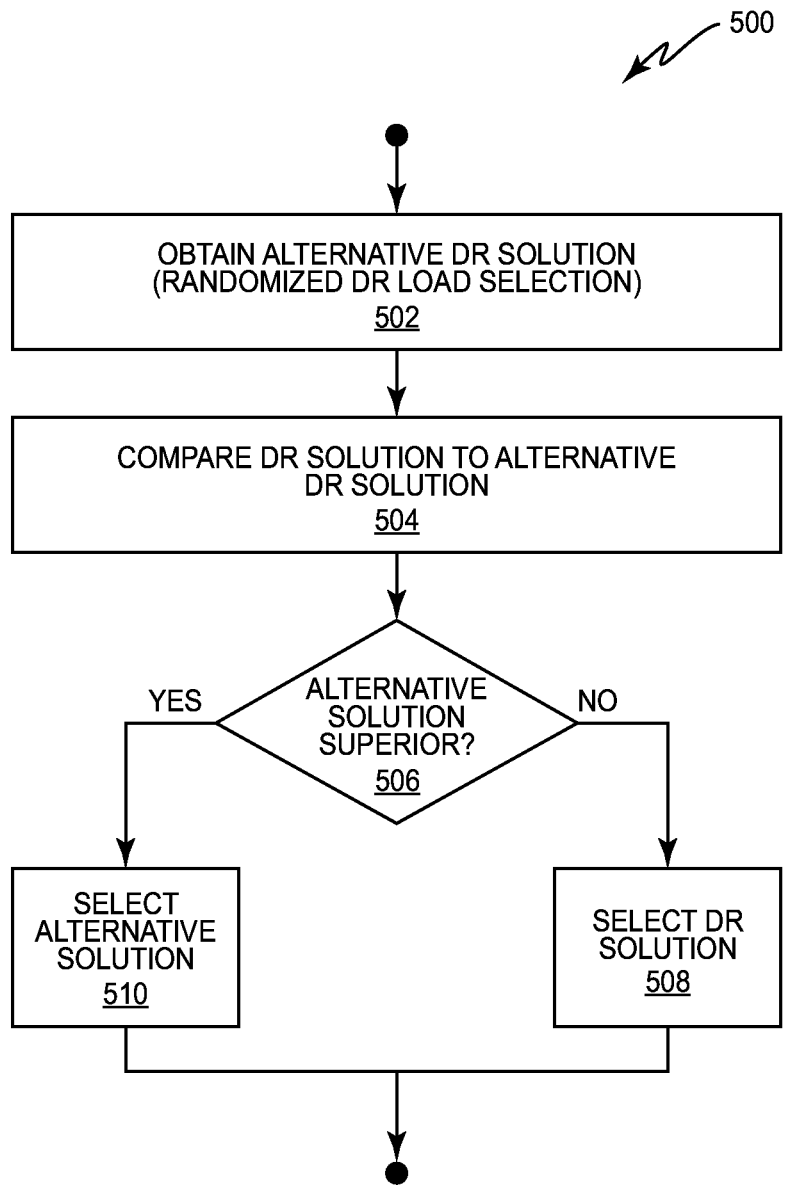
FIG. 5 is a logic flow diagram of one embodiment of additional processing operations that may be performed as an extension of the method introduced in FIG. 3.

FIG. 5 illustrates an example of the above processing by way of a method 500, which can be understood as an extension of the method 300. The method 500 includes obtaining an alternative demand response solution, e.g., a random selection of demand responsive loads 20 to include in the DR event, and corresponding load reduction values for them (Block 502). Processing continues with comparing the "computed" demand response solution determined in the method 300 of FIG. 3 with this alternative demand response solution (Block 504). If the alternative solution is superior, it is selected ("YES" from Block 506 into Block 510). Otherwise, the computed solution is selected ("NO" from Block 506 into Block 508). In the context of this comparison, the alternative solution will be considered as being superior to the computed solution if the load amount to be shed in the alternative solution is less than the load amount to be shed in the computed solution.

Of course, it is expected that the computed solution outlined in the method 300 will yield superior results all or most of the time. However, having the added step of comparing the model-aided solution against a random selection can serve as a rationality check or safeguard of sorts, and it will be understood that some embodiments simply use the demand response solution as computed in the method 300 without considering alternative solutions.

That is, given the full modeling provided by the model 44, the demand response solution computed via the method 300 generally will be optimal with respect to net load reductions in the PDN 10—i.e., the targeted load reduction of any given DR event will be satisfied to the greatest extent possible by reducing power losses in the PDN 10, without violating any system constraints, as compared to simply shedding actual customer loads. This optimization is possible because, as noted, the model 44 comprises a mathematical representation of the PDN 10 as a multi-phase unbalanced distribution network, including mathematical representations of the physical components in the power distribution network and the connecting relationships of those physical components.

Using the model 44 to evaluate power loss in the PDN 10 comprises, for example, evaluating power flow equations by applying the power and current balance laws at each node or bus 18 represented in the model 44, according to a known set of load values corresponding to the demand responsive loads 20, as adjusted for any particular combination of load reduction values being considered. In one example, such processing comprises finding the combination of load reduction values that minimizes, subject to the solution constraints, a power loss function for the PDN 10. Here, the power loss function is expressed as a function of the load reduction values and of a set of system states, and the solution constraints include any load reduction limits and load reduction timing restrictions associated with the demand responsive loads, and further include the network operating constraints, as applied to the set of system states.

The power loss function also may span a number of time intervals. In such cases, the processing represented by Block 306 of FIG. 3 comprises optimizing the power loss function over a number of time intervals within a defined time window, including computing an updated demand response solution at each of the time intervals. In this manner, different load selection combinations and/or different combinations of load reduction values may be computed for each time interval within a larger window of time, meaning that the "overall" solution for that window of time may be better optimized by adopting a number of different solutions in different intervals within the time window.

Another embodiment expresses the power loss function as a summation of branch power losses over a plurality of branches 16 represented in the model 44. This approach computes the (power) loss in each branch 16 as a function of the modeled branch resistance and the square of the branch current magnitude calculated according to each evaluated combination of load reduction values.

Yet another embodiment expresses the power loss function as a function of customer incentive payments that would arise from the application of each evaluated combination of load reduction values. That is, the utility may have agreements in place with given customers under which the utility is obligated to provide power discounts or provide billing credits, etc., whenever the demand responsive loads 20 of those customers are included in a DR event. This embodiment further highlights the economics.

To better understand these contemplated power loss function variations, consider again the model 44, which describes various distribution system components including distribution feeders, laterals, loads, transformers, capacitors, voltage regulators, distributed generators, and so on. Based on these component models, power flow equations are usually formulated by applying the power/current balance law at each bus/node. The solution of the power flow equations provides system operating status in terms of node voltage magnitudes and angles. Mathematical component models and power flow equations represent precisely and completely the static characteristics of each component as well as the entire distribution network operation status.

Figure 6:
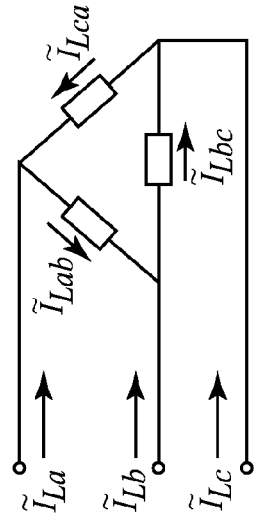
FIGS. 6-9 are block diagrams illustrating example modeling representations that may be used with respect to the mathematical modeling of a power distribution network.

FIG. 6 illustrates an example of a three-phase wye-connected demand responsive load 20, its mathematic model is provided in Equations (1)-(3).

$$\tilde{I}_a = \frac{1-u_{DR}}{z_L}\tilde{V}_{an} \quad (1)$$

$$\tilde{I}_b = \frac{1-u_{DR}}{z_L}\tilde{V}_{bn} \quad (2)$$

$$\tilde{I}_c = \frac{1-u_{DR}}{z_L}\tilde{V}_{cn} \quad (3)$$

where
- $\tilde{I}_a$, $\tilde{I}_b$, $\tilde{I}_c$: load currents on three phases,
- $\tilde{V}_{an}$, $\tilde{V}_{bn}$, $\tilde{V}_{cn}$: three phase voltages,
- $z_L$: load impedance,
- $u_{DR}$: demand responsive load control variable, also referred to as the "load reduction value," the value of which can vary between 0 to 1, thus representing the responsive load percentage in $z_L$.

Figure 7:
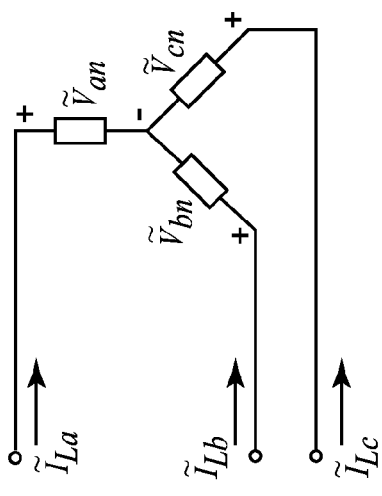
Figure 8:
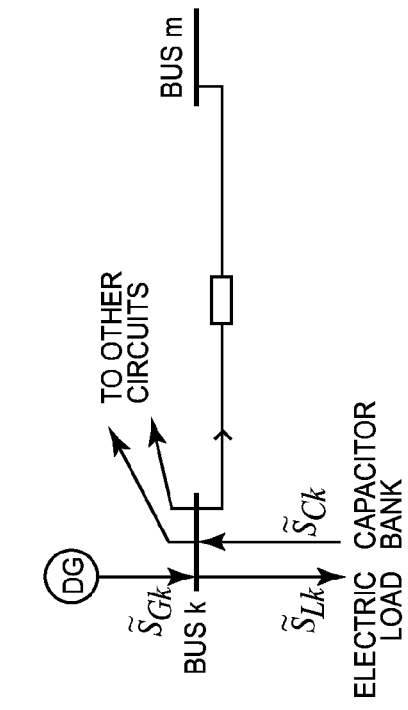

FIG. 7 illustrates a delta-connected load 20 that can be similarly represented, while FIG. 8 illustrates all the components connected to a distribution bus 18, denoted as "bus k," and the corresponding power balance equation at the distribution node is provided in Eq. (4).

$$\sum_{i=1}^{n} S_{ik} = g_k(x, u_{DR}) = 0 \quad (4)$$

where
- n: total number of components connected to bus k,
- $S_{ik}$: apparent power of component i and $S_{ik} = \tilde{V}_k \tilde{I}_i$ The set of power balance equations at every bus/node constitute the system power flow equations for the PDN 10.

Figure 9:
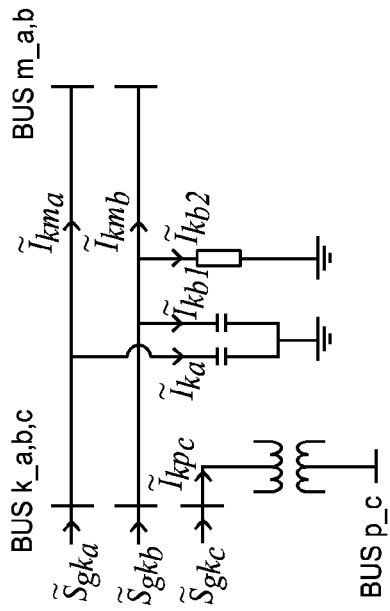

With the above in mind, and with reference to FIG. 9, a systematic way of writing the power flow equations for any bus is illustrated below. FIG. 9 illustrates a general bus k with three phases in a distribution system.

The constant electric powers injected to bus k_a,b,c are $S_{gk_a}$, $S_{gk_a}$, and $S_{gk_a}$. These injected electric powers are equal to the electric power flowing out bus k:

$$S_{gk_a} - (\tilde{V}_{k_a} - \tilde{V}_{m_a}) \cdot \tilde{I}_{km_a}^* - \tilde{V}_{k_a} \cdot \tilde{I}_{k_a}^* = 0 \quad (5)$$

$$S_{gk_b} - (\tilde{V}_{k_b} - \tilde{V}_{m_b}) \cdot \tilde{I}_{km_b}^* - \tilde{V}_{k_b} \cdot \tilde{I}_{k_{b1}}^* - \tilde{V}_{k_b} \cdot \tilde{I}_{k_{b2}}^* = 0 \quad (6)$$

$$S_{gk_c} - \tilde{V}_{k_c} \cdot \tilde{I}_{kp_c} = 0 \quad (7)$$

$$S_{Gk} + S_{Ck} = S_{Dk} + S_{Lk} + \sum_{i=1}^{n} S_{Lki}$$

Component currents in Eq. (5)-(7) can be expressed in terms of bus voltages as derived in the component models. Using equation (5) as an example, the currents of phase A distribution line and capacitor are expressed as follow:

$$\tilde{I}_{km_a} = \tilde{Y}_{km_{aa}} \cdot (\tilde{V}_{k_a} - \tilde{V}_{m_a}) + \tilde{Y}_{km_{ab}} \cdot (\tilde{V}_{k_b} - \tilde{V}_{m_b}) \quad (8)$$

$$\tilde{I}_{k_a} = jB_a \tilde{V}_{k_a} \quad (9)$$

Upon substitution of above relationships into equation (5):

$$S_{gk_a} - (\tilde{V}_{k_a} - \tilde{V}_{m_a}) \cdot (\tilde{Y}_{km_{aa}} \cdot (\tilde{V}_{k_a} - \tilde{V}_{m_a}) + \tilde{Y}_{km_{ab}} \cdot (\tilde{V}_{k_b} - \tilde{V}_{m_b}))^* - \tilde{V}_{k_a} \cdot (jB_a \tilde{V}_{k_a})^* = 0$$

These equations express power conservation at bus k for phase A. Similar equations can be written for phase b and phase c at bus k and phases at other buses in the distribution system. All these equations constitute the three-phase unbalanced power flow equations.

Further, with n buses in PDN 10, and assuming that except for the one slack bus, there are n−1 buses. The minimum set of variables describing the state of the system are:

the phase angle of bus voltages at all PQ buses:

$\delta_{2a}$ $\delta_{2b}$, $\delta_{2c}$ . . . $\delta_{na}$, $\delta_{nb}$, $\delta_{nc}$.

the voltage magnitude at all PQ buses:

$V_{2a}$ $V_{2b}$, $V_{2c}$ . . . $V_{na}$, $V_{nb}$, $V_{nc}$.

One may assume that bus 1 is always the slack bus, and that some buses do not have full three-phases, such that the corresponding bus voltage phase angle and magnitudes then do not exist.

The variables are the state variables x at issue in the model 44. The state vector will be determined from an appropriate set of independent equations. For the purpose of selecting these equations, consider the following equations:

real power balance equations; one for each bus each phase except the slack bus reactive power balance equations; one for each bus each phase except the slack bus These equations are independent. The only unknowns appearing in these equations are the voltage phases and the voltage magnitudes. The simultaneous solution of these equations will provide the state vector x, i.e., the solution to the power flow problem.

Power flow processing may be based on the Newton-Raphson method in polar form, where the three-phase unbalanced power flow problem is mathematically formulated as the solution of a set of linear and nonlinear equations. In compact form these equations can be written as:

$$g_p(x) = f_p(\delta, V) - b_p(\delta, V) = 0$$

$$g_q(x) = f_q(\delta, V) - b_q(\delta, V) = 0$$

where
- $f_p(\delta, V)$ all functions of real power flow,
- $f_q(\delta, V)$ all functions of reactive power flow,
- $b_p(\delta, V)$ real power injection, and
- $b_q(\delta, V)$ reactive power injection.

Direct application of Newton's numerical solution algorithm to the power flow equations is known as the Newton-Raphson method. Newton's method is reviewed in its general form and then applied to the power flow equations.

Consider a set of nonlinear equations:

$$g_1(x_1, \ldots, x_m) = 0 \quad (10)$$

$$\ldots$$

$$g_m(x_1, \ldots, x_m) = 0$$

Assume that estimates $x_1^0, \ldots x_m^0$ for the m variables are known. Further assume that these estimates do not satisfy the above equations, and thus a better estimate is necessary. Newton's method provides the means by which the new, better estimates can be obtained. For this purpose, the functions $g_1 \ldots g_m$ are linearized around the known estimate of $x_1^0, \ldots x_m^0$. The procedure yields:

$$g_1(x_1, \ldots, x_m) = g_1(x_1^0, \ldots, x_m^0) + \sum_{i=1}^{m} \frac{\partial g_1}{\partial x_i}(x_i - x_i^0) + h.o.t.$$

$$\ldots$$

$$g_m(x_1, \ldots, x_m) = g_m(x_1^0, \ldots, x_m^0) + \sum_{i=1}^{m} \frac{\partial g_m}{\partial x_i}(x_i - x_i^0) + h.o.t.$$

In the above expression, h.o.t. stands for higher order terms.

Assuming that the actual solution x is very close to the guess $x^0$, then the higher order terms will be negligible because they depend on terms $(x_i - x_i^0)^k$ where $k \geq 2$. Thus, neglecting the higher order terms, the following equations are obtained:

$$g_1(x_1^0, \ldots, x_m^0) + \sum_{i=1}^{m} \frac{\partial g_1}{\partial x_i}(x_i - x_i^0) \cong 0$$

$$\ldots$$

$$g_m(x_1^0, \ldots, x_m^0) + \sum_{i=1}^{m} \frac{\partial g_m}{\partial x_i}(x_i - x_i^0) \cong 0$$

In compact matrix notation, the above equations become:

$$g(x^0) + \left[\frac{\partial g}{\partial x}\right](x - x^0) = 0$$

where $$x^0 = \begin{bmatrix} x_1^0 \\ \ldots \\ x_m^0 \end{bmatrix},$$

$$g(x^0) = \begin{bmatrix} g_1(x_1^0, \ldots, x_m^0) \\ \ldots \\ g_m(x_1^0, \ldots, x_m^0) \end{bmatrix},$$

$$\frac{\partial g}{\partial x} = \begin{bmatrix} \frac{\partial g_1}{\partial x_1} & \ldots & \frac{\partial g_1}{\partial x_m} \\ & \ldots & \\ \frac{\partial g_m}{\partial x_1} & \ldots & \frac{\partial g_m}{\partial x_m} \end{bmatrix}$$

The matrix $$\frac{\partial g}{\partial x}$$

is recognized to be the Jacobian matrix of the functions g, computed at $x^0$ and will be symbolized with $J(x^0)$. Vector x is solved from the above equation:

$$x = x^0 - J^{-1}(x^0) \cdot g(x^0)$$

The vector x is a better estimate of the solution than vector $x^0$. The procedure can be applied to any vector $x^i$ yielding the following algorithm:

$$x^{i+1} = x^i - J^{-1}(x^i) \cdot g(x^i)$$

The algorithm should terminate whenever a vector $x^i$ has been found which makes the vector function $g(x^i)$ very small. Note that in this case, Eq. (10) is satisfied. In summary, the solution to a set of nonlinear equations can be obtained with the following steps:

Step 1. Assume an initial guess for x, i.e., $x^0$, let i=0

Step 2. Compute $g(x^i)$. If $|g(x^i)| \leq \epsilon$, then $x^i$ is the solution. In this case, terminate, otherwise, go to step 3.

Step 3. Compute the Jacobian matrix $J(x^i)$,

Compute $$x^{i+1} = x^i - J^{-1}(x^i) \cdot g(x^i)$$

Let i=i+1 and go to step 2.

Direct application of Newton's method on these equations yields:

$$\begin{bmatrix} \delta^{i+1} \\ V^{i+1} \end{bmatrix} = \begin{bmatrix} \delta^i \\ V^i \end{bmatrix} - \begin{bmatrix} \frac{\partial f_p}{\partial \delta} & \frac{\partial f_p}{\partial V} \\ \frac{\partial f_q}{\partial \delta} & \frac{\partial f_q}{\partial \delta} \end{bmatrix}^{-1} \cdot \begin{bmatrix} f_p(\delta^i, V^i) - b_p(\delta^i, V^i) \\ f_q(\delta^i, V^i) - b_q(\delta^i, V^i) \end{bmatrix},$$

where i is the iteration number in the solution procedure.

Figure 10:
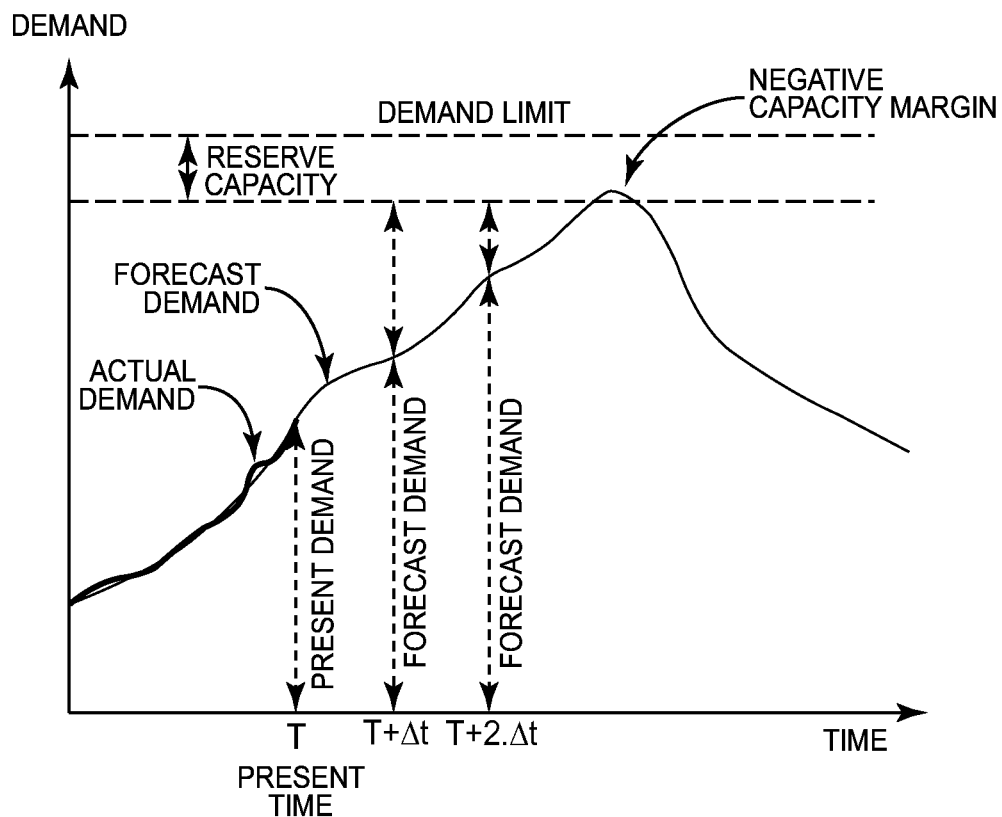
FIG. 10 is a diagram illustrating one example scenario that is associated with calling or otherwise triggering a demand response event.

The teachings herein thus integrate the above model 44 and such processing, or variations thereof, into the selection of demand responsive loads 20 for inclusion in a given DR event, which may be detected or called in view of the circumstances illustrated in FIG. 10, for example. There, the forecasted demand will impinge the reserve margin desired for the PDN 10 and a DR event is therefore called or triggered for the PDN 10.

However triggered, use of the model 44 in the demand responsive load selection procedure enables the computer system 32 to accurately assess the affect of various load selection combinations on the power loss in the PDN 10, and thus enables the computer system 32 to determine the combination that yields the greatest reduction in system loss while meeting the demand reduction requirement and satisfying all the network operating constraints such as node voltage and distribution line capacity limits. To achieve this objective, a general optimization problem is formulated in terms of the previously described power loss function, and is solved to obtain the demand responsive loads 20 that maximize the reduction in power loss in the system, while still meeting all applicable solution constraints.

The optimization problem explicitly includes the mathematical system loss calculation based on the demand responsive load selection. However, power flow equations and other necessary operating constraints are included as constraints, so that the solution of the model-based optimization problem provides the appropriately constrained outcome. Without the loss of generality, one example of such mathematical formulation is provided below.

One may formulate the problem as that of finding the combination of demand response control variables/signals ($u_{DR}$) to be sent to customers enrolled in the DR program in order to minimize the power loss function given as $$f = P_{Loss}(x, u_{DR}) \quad (11)$$

subject to the following constraints:

network power flow equations:

$$g(x, u_{DR}) = 0;$$

demand reduction balance:

$$\Delta P_{Loss} + \Delta P_L - \Delta P_{Des} = 0;$$

limits on the voltage magnitude of the nodes:

$V^{min} \leq |V_i| \leq V^{max}$, $i=1 \ldots n_{node}$;

limits on branch (line/transformer leg) loading levels:

$|I_i| \leq I_i^{max}$, $i=1 \ldots n_{branch}$;

DR constraints of the customers (minimum advance notice for the DR signal, maximum allowable event duration, maximum allowable number of DR events to be received in one day, etc.; and constraints on the minimum and maximum load values that can be shed for each customer.

Where:
x=set of system states, i.e., voltage magnitudes and phase angles;
$u_{DR}$=set of demand responsive load values (these are the controllable variables);
$\Delta P_{Loss}$=reduction value in the power losses of the system;
$\Delta P_L$=load reduction as a result of demand response;
$\Delta P_{Des}$=desired demand reduction;
$V^{min}$=node voltage magnitude lower limit;
$V^{max}$=node voltage magnitude upper limit;
$|V_i|$=voltage magnitude value at node i;
$|I_i|$=current magnitude value at branch i;
$I_i^{max}$=current magnitude upper limit of branch i;
$n_{node}$=total node number; and
$n_{branch}$=total branch number.

The power loss function can be represented in different formula, one example is provided below:

$$f = \sum_{i=1}^{n_{branch}} I_i(x, u_{DR})^2 r_i \quad (12)$$

In this power loss function, the loss in each branch (including distribution lines and transformer legs) is calculated first based on the branch resistance and the square of branch current magnitude, the sum of all the branch loss is the system loss. Each branch current is a function of system state variables (node voltage x) and demand response control variables $u_{DR}$.

In another optimization formulation variation, the algorithm can be solved for multiple time steps in the future (for example T time steps), in which case the objective function will be altered to include the time information as follows:

$$f = \sum_{t=1}^{T} P_{Loss}(x, u_{DR}, t) \quad (13)$$

And the demand reduction balance would be dependent on the time step, since the expected desired demand reduction for time t changes based on the load forecast results:

$\Delta P_{Loss}(t) + \Delta P_L(t) - \Delta P_{Des}(t) = 0 \quad (14)$

In yet another formulation, if the utility customers receive incentive payments upon receiving and complying with a DR signal, then it is possible to consider the economics of these incentive payments in the objective function as well:

$$f = \alpha \times P_{Loss}(x, DR) + \beta \times \sum_{i=1}^{N} C_i \quad (15)$$

where N denotes the total number of customers who receive the DR signal and $C_i$ corresponds to the incentive payment made to each one, $\alpha$ and $\beta$ are weighting factors corresponding to power loss and incentive payment, respectively.

However the power loss function is formulated, an example outline of the overall solution methodology appears below:

(1) A DR event is triggered automatically or by a utility operator and the target demand reduction is specified along with the time attributes of the event (start time and duration).

(2) The computer system 32 finds the solution to the optimization problem using mathematical programming or other methods, etc.

(3) The computer system 32 generates signaling or data corresponding to the solution, e.g., signaling for and/or an identification of the selected demand responsive loads, the corresponding load reduction values, and any financial incentive payment information for the involved customers, along with any financial loss information to the utility.

As noted, the computer system 32 also may double-check the computed demand response solution, such as by comparing it to a more traditionally computed solution, such as a random load selection. The comparison can be based on a user defined performance metric consisting of the main features mentioned above. The simplest form of metric can be a weighted linear combination. The final solution is selected, presented to the operator for approval and dispatched to the corresponding customers.

Notably, as a consequence of using the model 44, the computed demand response solution taught herein automatically accommodates a range of complexities, such as radial and meshed distribution network topologies. Use of the model 44 also permits the approach taught herein for demand responsive load selection to easily accommodate distributed generation sources 22 and 24 within the PDN 10. More broadly, it will be understood that the teachings herein exploit the model 44 to accommodate multi-phase, unbalanced distribution networks using detailed mathematical component models, such as Wye and/or Delta connected transformers (grounded or ungrounded), voltage dependent loads, and so on.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic or descriptive sense only and not for purposes of limitation.

What is claimed is:

1. A method in a computer system of selecting demand responsive loads in a power distribution network for inclusion in a demand response event having a defined load reduction target, said method comprising:

determining that the demand response event has been triggered for the power distribution network;

identifying demand responsive loads in the power distribution network that are candidates for inclusion in the demand response event;

selecting a set of the demand responsive loads to include in the demand response event and determining corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and saving or otherwise outputting a demand response solution that indicates the selected set of demand responsive loads and the corresponding load reduction values determined for the selected set of demand responsive loads, wherein the mathematical network model of the power distribution network comprises a mathematical representation of the power distribution network as a multiphase unbalanced distribution network, including mathematical representations of the physical components in the power distribution network and the connecting relationships of those physical components.

2. The method of claim 1, further comprising comparing the demand response solution to an alternative demand response solution involving a randomly selected set of the demand responsive loads, and selecting either the demand response solution or the alternative demand response solution in dependence on which one sheds the least amount of loading from the power distribution network.

3. The method of claim 1, further comprising sending signaling to customer premises equipment corresponding to the selected set of demand responsive loads, indicating the corresponding load reduction values determined for the selected set of demand responsive loads, to effectuate the demand response solution.

4. A method in a computer system of selecting demand responsive loads in a power distribution network for inclusion in a demand response event having a defined load reduction target, said method comprising:

determining that the demand response event has been triggered for the power distribution network;

identifying demand responsive loads in the power distribution network that are candidates for inclusion in the demand response event;

selecting a set of the demand responsive loads to include in the demand response event and determining corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and saving or otherwise outputting a demand response solution that indicates the selected set of demand responsive loads and the corresponding load reduction values determined for the selected set of demand responsive loads, wherein using the mathematical network model to evaluate power loss in the power distribution network as a function of different combinations of demand responsive load selections and corresponding load reduction values comprises evaluating power flow equations by applying the power and current balance laws at each bus or node represented in the mathematical network model, according to a known set of load values corresponding to the demand responsive loads, as adjusted for any particular combination of load reduction values being considered.

5. A method in a computer system of selecting demand responsive loads in a power distribution network for inclusion in a demand response event having a defined load reduction target, said method comprising:

determining that the demand response event has been triggered for the power distribution network;

identifying demand responsive loads in the power distribution network that are candidates for inclusion in the demand response event;

selecting a set of the demand responsive loads to include in the demand response event and determining corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and saving or otherwise outputting a demand response solution that indicates the selected set of demand responsive loads and the corresponding load reduction values determined for the selected set of demand responsive loads, wherein using the mathematical network model to evaluate power loss in the power distribution network as a function of different combinations of demand responsive load selections and corresponding load reduction values comprises finding the combination of load reduction values that minimizes, subject to the solution constraints, a power loss function for the power distribution network subject that is expressed as a function of the load reduction values and of a set of system states, and wherein the solution constraints include any load reduction limits and load reduction timing restrictions associated with the demand responsive loads, and further include the network operating constraints, as applied to the set of system states.

6. The method of claim 5, further comprising optimizing the power loss function over a number of time intervals within a defined time window, including computing an updated demand response solution at each of the time intervals.

7. The method of claim 5, further comprising further expressing the power loss function as a summation of branch power losses over a plurality of branches represented in the mathematical network model, and computing the loss in each branch as a function of the modeled branch resistance and the square of the branch current magnitude calculated according to each evaluated combination of load reduction values.

8. The method of claim 5, further comprising further expressing the power loss function as a function of customer incentive payments that would arise from the application of each evaluated combination of load reduction values.

9. A computer system configured to select demand responsive loads in a power distribution network for inclusion in a demand response event having a defined load reduction target, said computer system comprising:
one or more memory or storage elements;
input/output interface circuitry; and
a processing circuit operatively associated with the input/output interface circuitry and the one or more memory or storage elements, said processing circuit configured to:
determine that the demand response event has been triggered for the power distribution network;
identify demand responsive loads in the power distribution network that are candidates for inclusion in the demand response event;
select a set of the demand responsive loads to include in the demand response event and determine corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and
save or otherwise output a demand response solution that indicates the selected set of demand responsive loads and the corresponding load reduction values determined for the selected set of demand responsive loads,
wherein the mathematical network model of the power distribution network comprises a mathematical representation of the power distribution network as a multi-phase unbalanced distribution network, including mathematical representations of the physical components in the power distribution network and the connecting relationship of those physical components.

10. The computer system of claim 9, wherein the processing circuit is configured to compare the demand response solution to an alternative demand response solution involving a randomly selected set of the demand responsive loads, and select either the demand response solution or the alternative demand response solution in dependence on which one sheds the least amount of loading from the power distribution network.

11. The computer system of claim 9, wherein the processing circuit is configured to send signaling to customer premises equipment corresponding to the selected set of demand responsive loads, indicating the corresponding load reduction values determined for the selected set of demand responsive loads, to effectuate the demand response solution.

12. A computer system configured to select demand responsive loads in a power distribution network for inclusion in a demand response event having a defined load reduction target, said computer system comprising:
one or more memory or storage elements;
input/output interface circuitry; and
a processing circuit operatively associated with the input/output interface circuitry and the one or more memory or storage elements, said processing circuit configured to:
determine that the demand response event has been triggered for the power distribution network;
identify demand responsive loads in the power distribution network that are candidates for inclusion in the demand response event;
select a set of the demand responsive loads to include in the demand response event and determine corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and
save or otherwise output a demand response solution that indicates the selected set of demand responsive loads and the corresponding load reduction values determined for the selected set of demand responsive loads,
wherein the processing circuit is configured to use the mathematical network model to evaluate the power loss in the power distribution network as a function of different combinations of demand responsive load selections and corresponding load reduction values, based on evaluating power flow equations, including applying the power and current balance laws at each bus or node represented in the mathematical network model, according to a known set of load values corresponding to the demand responsive loads, as adjusted for any particular combination of load reduction values being considered.

13. A computer system configured to select demand responsive loads in a power distribution network for inclusion in a demand response event having a defined load reduction target, said computer system comprising:
one or more memory or storage elements;
input/output interface circuitry; and
a processing circuit operatively associated with the input/output interface circuitry and the one or more memory or storage elements, said processing circuit configured to:
determine that the demand response event has been triggered for the power distribution network;
identify demand responsive loads in the power distribution network that are candidates for inclusion in the demand response event;
select a set of the demand responsive loads to include in the demand response event and determine corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and save or otherwise output a demand response solution that indicates the selected set of demand responsive loads and the corresponding load reduction values determined for the selected set of demand responsive loads, wherein the processing circuit is configured to use the mathematical network model to evaluate the power loss in the power distribution network as a function of different combinations of demand responsive load selections and corresponding load reduction values, based on finding the combination of load reduction values that minimizes, subject to the solution constraints, a power loss function for the power distribution network that is expressed as a function of the load reduction values and of a set of system states, and wherein the solution constraints include any load reduction limits and load reduction timing restrictions associated with the demand responsive loads, and further include the network operating constraints, as applied to the set of system sates.

14. The computer system of claim 13, wherein the processing circuit is configured to optimize the power loss function over a number of time intervals within a defined time window, including computing an updated demand response solution at each of the time intervals.

15. The computer system of claim 13, wherein the processing circuit is configured to further express the power loss function as a function of customer incentive payments that would arise from the application of the different combinations of load reduction values.

16. A computer system configured to select demand responsive loads in a power distribution network for inclusion in a demand response event having a defined load reduction target, said computer system comprising:
one or more memory or storage elements;
input/output interface circuitry; and
a processing circuit operatively associated with the input/output interface circuitry and the one or more memory or storage elements, said processing circuit configured to:
determine that the demand response event has been triggered for the power distribution network;
identify demand responsive loads in the power distribution network that are candidates for inclusion in the demand response event;
select a set of the demand responsive loads to include in the demand response event and determine corresponding load reduction values for the selected set of demand responsive loads based on using a mathematical network model to evaluate power loss in the power distribution network as a function of different combinations of demand responsive load selections and corresponding load reduction values, to determine which combination of demand responsive load selections and corresponding load reduction values maximizes a reduction in power loss in the power distribution network while simultaneously satisfying the defined load reduction target and a number of solution constraints that include one or more network operating constraints, including at least one of power flow limits, node voltage limits and distribution line capacity limits; and
save or otherwise output a demand response solution that indicates the selected set of demand responsive loads and the corresponding load reduction values determined for the selected set of demand responsive loads,
wherein the processing circuit is configured to express the power loss function as a summation of branch power losses over a plurality of branches represented in the mathematical network model, and to compute the power loss in each branch as a function of the modeled branch resistance and the square of the branch current magnitude calculated according to the different combinations of load reduction values.

* * * * *